(12) United States Patent
Kosaka (10) Patent No.: US 8,023,030 B2
(45) Date of Patent: Sep. 20, 2011

(54) IMAGE PICKUP APPARATUS

(75) Inventor: Takashi Kosaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 908 days.

(21) Appl. No.: 11/832,437

(22) Filed: Aug. 1, 2007

(65) Prior Publication Data

US 2008/0036895 A1   Feb. 14, 2008

(30) Foreign Application Priority Data

Aug. 11, 2006   (JP) ................................. 2006-219847

(51) Int. Cl.
*H04N 5/222* (2006.01)
(52) U.S. Cl. .............................. 348/333.03; 348/333.09
(58) Field of Classification Search ............. 348/333.03, 348/333.09
See application file for complete search history.

(56) References Cited

U.S. PATENT DOCUMENTS

| 5,541,400 A | 7/1996 | Hagiwara | |
|---|---|---|---|
| 6,757,020 B1 * | 6/2004 | Kikuchi | .................. 348/333.01 |
| 2002/0054232 A1 | 5/2002 | Inagaki | |
| 2003/0063208 A1 * | 4/2003 | Kazami | ..................... 348/333.13 |
| 2004/0169742 A1 | 9/2004 | Shibutani | |
| 2006/0140616 A1 * | 6/2006 | Kuruma | ........................ 396/165 |

FOREIGN PATENT DOCUMENTS

| JP | 2000-165705 A | 6/2000 |
|---|---|---|
| JP | 2001-059984 A | 3/2001 |
| JP | 2002-277937 A | 9/2002 |
| JP | 2004-165934 A | 6/2004 |
| KR | 1998-0015417 A | 5/1998 |
| KR | 2004-0077498 A | 9/2004 |

* cited by examiner

*Primary Examiner* — David Ometz
*Assistant Examiner* — Dillon Durnford Geszvain
(74) *Attorney, Agent, or Firm* — Canon USA, Inc. IP Division (57) ABSTRACT

An image pickup apparatus includes a display that displays photographing information. When the display is turned off in response to an operation performed by a user, the photographing information is prevented from being changed even if a button or a dial for changing a set value, such as a shutter speed or an aperture value, is operated.

9 Claims, 8 Drawing Sheets

| | DISPLAY CONTROL SWITCH: ON | | DISPLAY CONTROL SWITCH: OFF |
|---|---|---|---|
| | EYE DETECTION: YES | EYE DETECTION: NO | |
| DURING PHOTOMETRY | DISPLAY 28: OFF<br>DISPLAY 54: ON<br>SETTING: ENABLED | DISPLAY 28: ON<br>DISPLAY 54: ON<br>SETTING: ENABLED | DISPLAY 28: OFF<br>DISPLAY 54: ON<br>SETTING: ENABLED |
| PHOTOMETRY STOPPED | DISPLAY 28: OFF<br>DISPLAY 54: OFF<br>SETTING: ENABLED | DISPLAY 28: ON<br>DISPLAY 54: OFF<br>SETTING: ENABLED | DISPLAY 28: OFF<br>DISPLAY 54: OFF<br>SETTING: DISABLED |

| | DISPLAY CONTROL SWITCH: ON | | DISPLAY CONTROL SWITCH: OFF |
|---|---|---|---|
| | EYE DETECTION: YES | EYE DETECTION: NO | |
| DURING PHOTOMETRY | DISPLAY 28: OFF<br>DISPLAY 54: ON<br>SETTING: ENABLED | DISPLAY 28: ON<br>DISPLAY 54: ON<br>SETTING: ENABLED | DISPLAY 28: OFF<br>DISPLAY 54: ON<br>SETTING: ENABLED |
| PHOTOMETRY STOPPED | DISPLAY 28: OFF<br>DISPLAY 54: OFF<br>SETTING: ENABLED | DISPLAY 28: ON<br>DISPLAY 54: OFF<br>SETTING: ENABLED | DISPLAY 28: OFF<br>DISPLAY 54: OFF<br>SETTING: DISABLED |

IMAGE PICKUP APPARATUS

BACKGROUND OF THE INVENTION

1. Field of the Invention

The present invention relates to image pickup apparatuses, and more particularly, to an image pickup apparatus having a display for displaying photographing information.

2. Description of the Related Art

Recently, digital cameras having liquid crystal displays on the back have become popular. Such a liquid crystal display has a backlight and displays image data and photographing information. On the other hand, in single-lens reflex cameras, in addition to the liquid crystal display for displaying the image data, a conventional optical finder mechanism is required having a mirror mechanism and the like.

In a camera including both a liquid crystal display and an optical finder, an operating member is generally provided for turning the display of the liquid crystal display on and off.

Japanese Patent Laid-Open No. 2000-165705 discusses a structure in which the display of the liquid crystal display is turned off while a user is looking through the optical finder.

Conventionally, a liquid crystal display for displaying photographing information, such as a shutter speed and an aperture value, has generally been provided in addition to the liquid crystal display for displaying the image data. However, recently, in order to reduce the size of the camera main body and costs, the liquid crystal display for displaying the image data has been used to display the photographing information also. Thus, the two liquid crystal displays are combined into one.

However, in the case in which the liquid crystal display for displaying the image data is used also for displaying the photographing information, the following problems occur. That is, when the liquid crystal display is turned off to, for example, reduce power consumption, the photographing information including set values, such as the shutter speed and the aperture value, cannot be displayed anywhere. Therefore, there is a risk that the user will touch a button or a dial for changing the set values, such as the shutter speed and the aperture value, by mistake while the liquid crystal display that displays the photographing information is turned off. In such a case, the set values, such as the shutter speed and the aperture value, will be unintentionally changed while the user is not aware of the change in the set values.

SUMMARY OF THE INVENTION

According to an aspect of the present invention, while a display controller controls a display so as not to display a photographing condition, a photographing-condition setting unit is controlled so as not to set the photographing condition even when an operating member is operated.

Further features of the present invention will become apparent from the following description of exemplary embodiments with reference to the attached drawings.

DESCRIPTION OF THE EMBODIMENTS

First Exemplary Embodiment

A single-lens reflex digital camera according to a first embodiment of the present invention will be described below with reference to the drawings.

Figures 1, 1A:
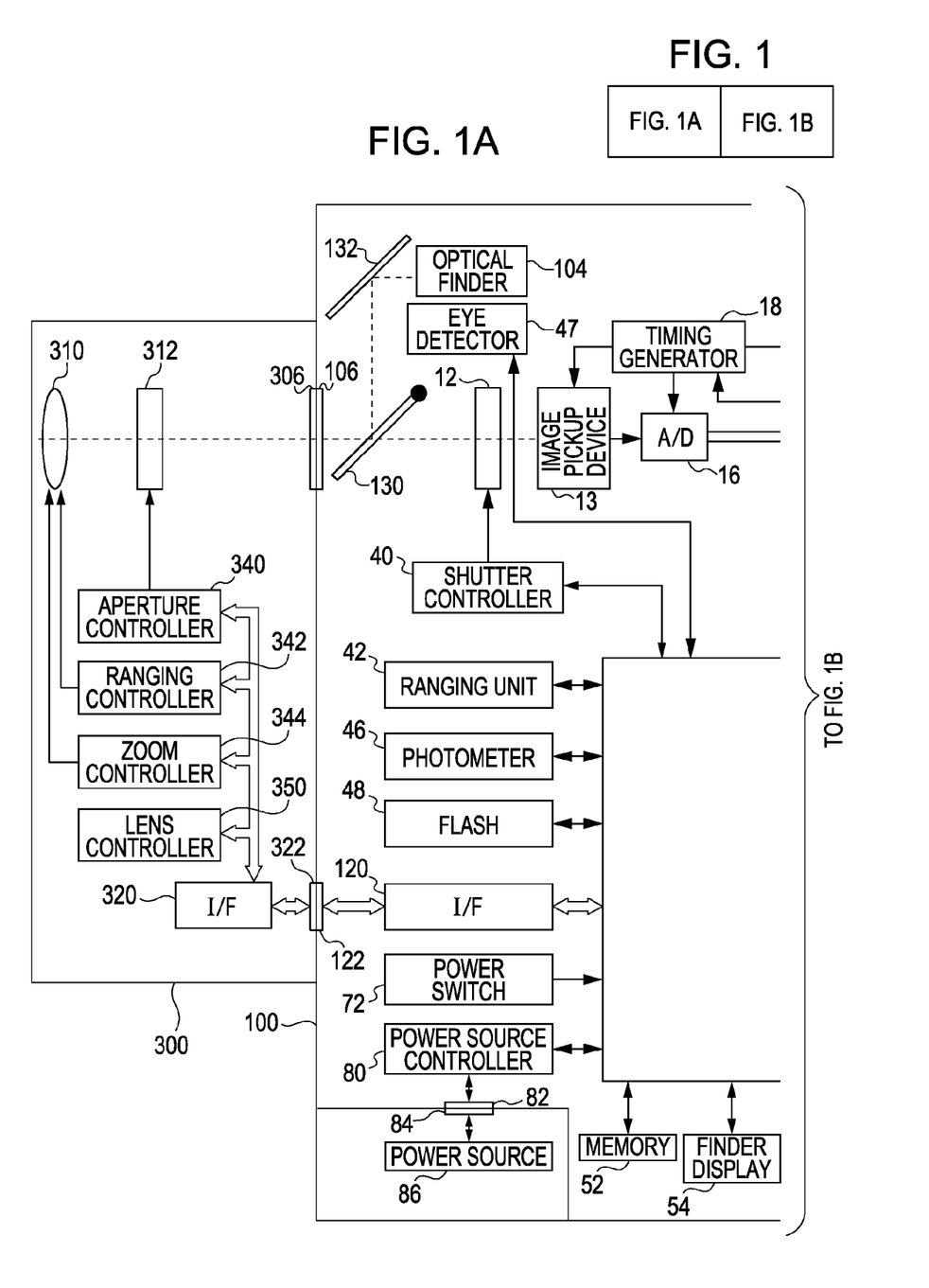
FIGS. 1A and 1B are block diagrams illustrating a single-lens reflex digital camera.
Figure 1B:
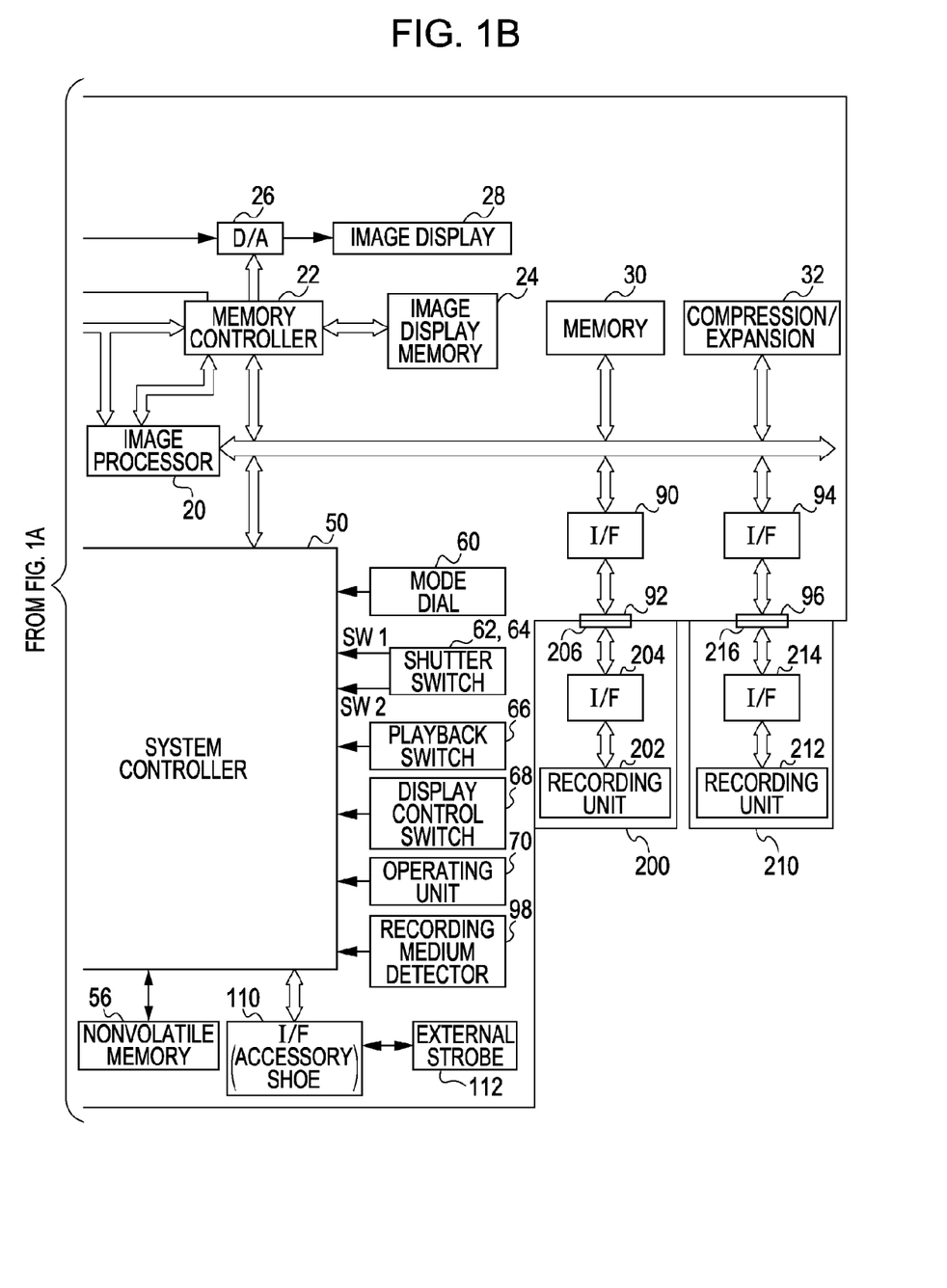

Referring to FIG. 1, the single-lens reflex digital camera includes an image processing apparatus 100. A shutter 12 controls the exposure of an image pickup element 13. The image pickup element 13 converts an optical image into an electric signal. A light beam incident on a lens 310 is guided through the aperture 312, lens mounts 306 and 106, a mirror 130, and the shutter 12 by a single-lens reflex method and forms an optical image on the image pickup element 13.

An A/D converter 16 converts an analog signal output from the image pickup element 13 into a digital signal. A timing generator circuit 18 supplies clock signals and control signals to the image pickup element 13, the A/D converter 16, and a D/A converter 26, and is controlled by a memory control circuit 22 and a system control circuit 50. An image processing circuit 20 performs a predetermined image interpolation process and a predetermined color conversion process based on data obtained from the A/D converter 16 or the memory control circuit 22.

The image processing circuit 20 also performs a predetermined calculation process using data of the captured image as necessary. On the basis of the thus-obtained calculation result, the system control circuit 50 performs a through-the-lens (TTL) autofocus (AF) process, an automatic exposure (AE) process, and an electronic flash (EF) process for controlling a shutter controller 40 and a ranging unit 42.

The image processing circuit 20 also performs another predetermined calculation process using the data of the captured image, and then performs a TTL automatic white balance (AWB) process based on the calculation result.

In the present embodiment, the ranging unit 42 and a photometer 46 are provided as dedicated units. Therefore, the AF process, the AE process, and the EF process can also be performed by the ranging unit 42 and the photometer 46. In such a case, it is not necessary to perform the AF process, the AE process, and the EF process using the image processing circuit 20. Alternatively, the AF process, the AE process, and the EF process can be performed by the image processing circuit 20 in addition to the AF process, the AE process, and the EF process performed by the ranging unit 42 and the photometer 46.

The memory control circuit 22 controls the A/D converter 16, the timing generator circuit 18, the image processing circuit 20, an image display memory 24, a D/A converter 26, a memory 30, and a compression/expansion circuit 32. The data from the A/D converter 16 is stored in the image display memory 24 or the memory 30 through the image processing circuit 20 and the memory control circuit 22 or directly through the memory control circuit 22.

The image data to be displayed is stored in the image display memory 24. An image display 28, such as a TFT display or an LCD, displays the image data received from the image display memory 24 through the D/A converter 26.

The memory 30 stores photographed still images. The capacity of the memory 30 is large enough to store a plurality of pages of still images. Accordingly, in a continuous photographing mode in which a plurality of still images are continuously photographed, a large volume of images can be stored in the memory 30 at a high speed. The memory 30 can also be used as a work area for the system control circuit 50.

The compression/expansion circuit 32 compresses and expands the image data by, for example, adaptive discrete cosine transformation (ADCT) or the like. The compression/expansion circuit 32 reads the images stored in the memory 30, performs a process of compressing or expanding the image data, and stores the thus-obtained data in the memory 30.

The shutter controller 40 operates in association with an aperture controller 340, which controls the aperture 312, and controls the shutter 12 on the basis of photometry information obtained from the photometer 46.

The ranging unit 42 performs the AF process. The light beam incident on the lens 310 is guided by the single-lens reflex method so as to be incident on the ranging unit 42 through the aperture 312, the lens mounts 306 and 106, the mirror 130, and a ranging sub mirror (not shown). Accordingly, an in-focus state of the image formed as the optical image can be determined.

The photometer 46 performs the AE process. The light beam incident on the lens 310 is guided by the single-lens reflex method so as to be incident on the photometer 46 through the aperture 312, the lens mounts 306 and 106, the mirror 130, another mirror 132, and a photometry lens (not shown). Accordingly, an exposure state of the image formed as the optical image can be determined. In addition, the photometer 46 also performs the EF process together with a flash 48.

The flash 48 also has an AF-auxiliary-light projecting function and a flash adjustment function. The flash 48 can perform the AF control using both the measurement result obtained by the ranging unit 42 and the result of calculation performed by the image processing circuit 20 on the basis of the image data obtained by the image pickup element 13. In addition, the flash 48 can also perform exposure control using both the measurement result obtained by the photometer 46 and the result of calculation performed by the image processing circuit 20 on the basis of the image data obtained by the image pickup element 13.

An eye detector 47 is disposed near an eyepiece included in optical finder 104. The eye detector 47 detects whether or not the user is looking through the eyepiece, that is, whether or not the user is using the optical finder 104. The eye detector 47 includes a light-emitting element and a light-receiving element. When a light pulse emitted from the light-emitting element is reflected by an eye or a face of the user and is received by the light-receiving element, it is determined that the user is looking through the eyepiece. A detailed circuit structure is not particularly limited. In addition, the detection method is also not particularly limited.

The system control circuit 50 controls the overall operation of the image processing apparatus 100. A memory 52 stores constants, parameters, programs, etc. for the operation. In accordance with a program that is executed, the system control circuit 50 causes the image display 28 or a finder display 54 provided in the optical finder 104 to display characters, images, etc., representing an operating state, a message, etc.

Display contents that can be displayed on the image display 28 include, for example, a single/continuous photographing mode display, a self-timer display, a compression ratio display, a display of the number of recording pixels, a display of the number of recorded images, a display of the remaining number of recordable images, a shutter speed display, an aperture value display, an exposure correction display, a flash correction display, an external-strobe intensity display, a red-eye reduction display, a buzzer setting display, a remaining battery level display, an error display, a display of information indicated by a multiple-digit number, a display of the attached/detached state of recording media 200 and 210, a display of the attached/detached state of a lens unit 300, a communication I/F operation display, a date/time display, and a display of the state of connection with an external computer.

Display contents that can be displayed on the finder display 54 in the optical finder 104 include, for example, an in-focus state display, a display of completion of preparation for photographing, a motion-blur alarm display, a flash battery charge display, a display of completion of flash battery charge, a shutter speed display, an aperture value display, an exposure correction display, and a display of an operation for writing data in the recording media.

A nonvolatile memory 56 is, for example, an EEPROM that can be electrically cleared and recorded on. Operating units 60, 62, 64, 66, 68, and 70 are provided for inputting various operation commands to the system control circuit 50, and are composed of one or more combinations of switches and dials.

The operating units will be described in more detail below. A mode dial switch 60 is used for switching between various photographing modes, such as an automatic photographing mode, a program photographing mode, a shutter speed priority photographing mode, an aperture priority photographing mode, a manual photographing mode, a depth-of-field priority (DEP) photographing mode, a portrait photographing mode, a landscape photographing mode, a close-up photographing mode, a sports photographing mode, and a night-scene photographing mode.

The operating unit 62 is a shutter switch SW1 that is switched on when a shutter button (not shown) is operated halfway. When the shutter switch SW1 is switched on, a command to start the AF process, the AE process, the AWB process, the EF process, etc., is issued. The operating unit 64 is a shutter switch SW2 that is switched on when the shutter button (not shown) is fully operated. When the shutter switch SW2 is switched on, a command to start a series of processes including an exposure process, a development process, and a recording process is issued. In the exposure process, a signal read from the image pickup element 13 is stored in the memory 30 in the form of image data through the A/D converter 16 and the memory control circuit 22. The development process is carried out by calculations at the image processing circuit 20 and the memory control circuit 22. In the recording process, the image data is read from the memory 30, compressed at the compression/expansion circuit 32, and written to the recording medium 200 or 210.

A playback switch 66 issues a command to start a playback operation in which the photographed image is read from the memory 30 or the recording medium 200 or 210 and is displayed on the image display in the photographing mode.

A display control switch 68 is used for setting whether to turn on or off the image display 28.

The operating unit 70 includes, for example, various buttons and a touch panel. Examples of the buttons are a menu button, a set button, a multi-screen-playback new-page button, a flash setting button, a single/continuous/self-timer switching button, a menu movement plus (+) button, a menu movement minus (−) button, a playback image movement plus (+) button, a playback image movement minus (−) button, a photographing quality selection button, an exposure correction button, a light control correction button, an external strobe intensity setting button, a date/time setting button, a quick-review ON/OFF switch for setting a quick-review function for automatically displaying image data immediately after the image is photographed, a compression-mode switch for selecting a J-compression ratio of the image, and a playback switch for setting various modes including a playback mode, a multiple-image playback/delete mode, a PC-connection mode, and an AF mode setting switch. With regard to the functions of the plus and minus buttons, numbers and functions can be more easily selected when a dial switch is provided.

A power switch 72 is provided for switching between a power-on mode and a power-off mode of the image processing apparatus 100. The power switch 72 can also switch between a power-on mode and a power-off mode for various devices, such as the lens unit 300, the external strobe, and the recording media 200 and 210, that are connected to the image processing apparatus 100.

A power supply control unit 80 includes a battery detecting circuit, a DC-DC converter, and a switching circuit for switching a block to be energized. The power supply control unit 80 detects whether or not a battery is installed, the type of the battery, and remaining battery power and controls the DC-DC converter on the basis of the result of the detection and a command from the system control circuit 50. Accordingly, a necessary voltage is supplied to each of the components including a recording medium for a required period of time.

In addition, connectors 82 and 84 and a power source 86 are provided. The power source 86 includes a primary battery, such as an alkaline battery or a lithium battery, a secondary battery, such as a NiCd battery or a Li battery, and an AC adapter.

Interfaces 90 and 94 are provided for the recording media, such as memory cards or hard discs, and connectors 92 and 96 provide connection with the recording media. A recording medium detector 98 detects whether or not the recording medium 200 or 210 is attached to the connector 92 and/or the connector 96.

In the present embodiment, the interfaces and connectors for attaching the recording media are provided in pairs. However, the interfaces and connectors for attaching the recording media may, of course, be provided singly or in numbers greater than two. In addition, interfaces and connectors of different specifications may be used in combination. Interfaces and connectors in conformity with specifications of, for example, PCMCIA cards or compact flash (CF) cards may be used for the above-described interfaces and connectors.

When the interfaces 90 and 94 and the connectors 92 and 96 are in conformity with the specifications of the PCMCIA cards or the CF cards, it is possible to communicate image data and management information related to the image data with peripheral devices, such as another computer or printer, by connecting any one of various communication cards such as a LAN card, a modem card, a USB card, and an IEEE 1394 card.

The light beam incident on the lens 310 is guided by the single-lens reflex method such that the light beam passes through the aperture 312, the lens mounts 306 and 106, the mirrors 130 and 132, and forms an optical image on the optical finder 104. Accordingly, an image can be photographed without using an electronic finder function of the image display unit 28, that is, by using only the optical finder 104. The finder display 54 is disposed in the optical finder 104. Accordingly, the in-focus state display, the motion-blur alarm display, the flash battery charge display, the shutter speed display, the aperture value display, the exposure correction display, etc., are shown in the optical finder 104.

An external strobe device 112 is attached with an accessory shoe 110.

An interface 120 connects the image processing apparatus 100 to the lens unit 300 in the lens mount 106. A connector 122 electrically connects the image processing apparatus 100 to the lens unit 300. A lens detector detects whether or not the lens unit 300 is attached to the lens mount 106 and/or the connector 122.

The connector 122 transmits a control signal, a state signal, a data signal, etc., between the image processing apparatus 100 and the lens unit 300. In addition, the connector 122 supplies currents with various voltages. The connector 122 can also provide optical communication, audio communication, etc., in addition to the electrical communication.

The mirrors 130 and 132 guide the light beam incident on the lens 310 toward the optical finder 104 by the single-lens reflex method. The mirror 132 may either be a quick-return mirror or a half silvered mirror.

The recording medium 200 can be, for example, a memory card or a hard disc. The recording medium 200 includes a recording unit 202, such as a semiconductor memory or a magnetic disc, an interface 204 for the image processor 100, and a connector 206 for providing connection with the image processor 100.

The recording medium 210 can be, for example, a memory card or a hard disc. The recording medium 210 includes a recording unit 212, such as a semiconductor memory or a magnetic disc, an interface 214 for the image processor 100, and a connector 216 for providing connection with the image processor 100.

The lens unit 300 is interchangeable, and is mechanically attached to the image processing apparatus 100 with the lens mount 306. The lens mount 306 has various functions for electrically connecting the lens unit 300 with the image processing apparatus 100. The lens unit 300 includes the lens 310, which is an imaging lens, and the aperture 312. An interface 320 connects the lens unit 300 with the image processing apparatus 100 in the lens mount 306. A connector 322 electrically connects the lens unit 300 with the image processing apparatus 100.

The connector 322 transmits a control signal, a state signal, a data signal, etc., between the image processing apparatus 100 and the lens unit 300. In addition, the connector 322 supplies or receives currents with various voltages. The connector 322 can also provide optical communication, audio communication, etc., in addition to the electrical communication.

The aperture controller 340 operates in association with the shutter controller 40 for controlling the shutter 12 so as to control the aperture 312 on the basis of the photometry information obtained from the photometer 46.

A ranging controller 342 controls a focusing operation of the imaging lens 310, and a zoom controller 344 controls a zooming operation of the imaging lens 310.

A lens system control circuit 350 controls the overall operation of the lens unit 300. The lens system control circuit 350 includes a memory for storing constants, parameters, programs, etc., for the operation and a nonvolatile memory. The nonvolatile memory stores identification information, such as a serial number of the lens unit 300, management information, functional information, and current and old set values. The functional information includes an open aperture value, a minimum aperture value, a focal length, etc.

The relationship between the display contents of the image display 28 and the finder display 54 and the states of the eye detector 47 and the display control switch 68 will be described below.

Figure 2A:
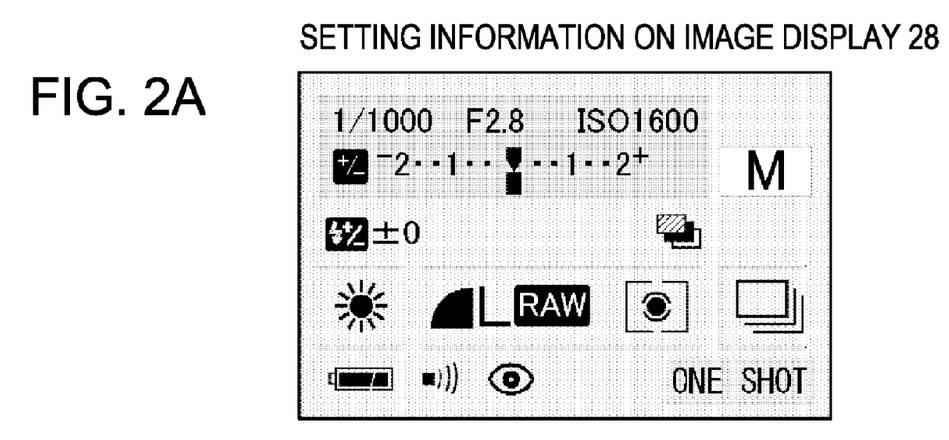
FIG. 2A is a diagram illustrating display contents of an image display.
Figure 2B:
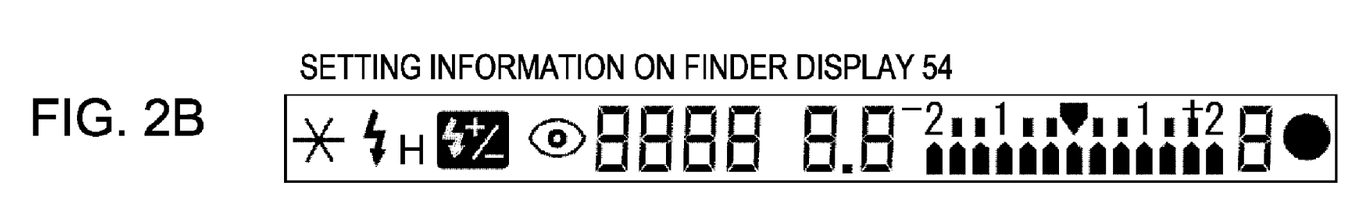
FIG. 2B is a diagram illustrating display contents of a finder display.

Examples of setting information displayed on the image display 28 and the finder display 54 are shown in FIGS. 2A and 2B, respectively.

Figure 3:
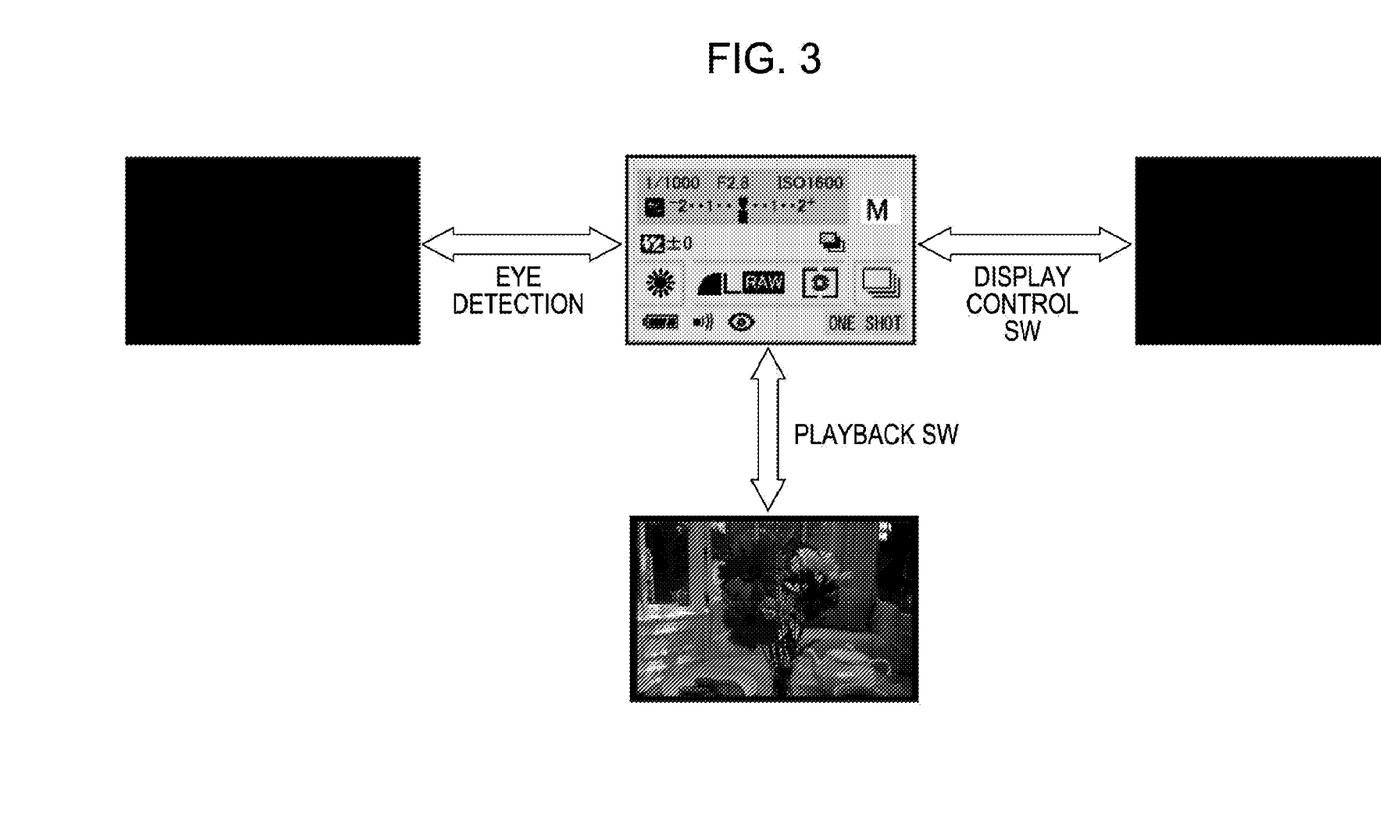
FIG. 3 is a diagram illustrating the manner in which the display state of the image display changes.

FIG. 3 is a diagram illustrating the manner in which the display state of the image display 28 is changed in accordance with the state of the eye detector 47, the operation of the display control switch 68, and the operation of the playback switch 66. As described above, photographed images and various information displays can be displayed on the image display 28. In a normal standby mode, the image display 28 shows setting information, such as the shutter speed display, the aperture value display, and the exposure correction display. In this state, when the playback switch 66 is operated, the image display 28 stops showing the setting information display and displays a recorded image. If the playback switch 66 is operated again while the recorded image is being displayed on the image display 28, the setting information display is shown again.

When, for example, power consumption is to be reduced without reducing the photographing response, the setting information display shown on the image display 28 can be turned off without turning off the power of the image processing apparatus 100 with the power switch 72. In such a case, the display control switch 68 is operated to turn off the setting information display shown on the image display 28. If the display control switch 68 is operated again while the setting information display is turned off, the image display 28 is turned on and the setting information display is shown again.

If the eye detector 47 detects that the user is looking through the optical finder 104 while the setting information is displayed on the image display 28, the image display 28 is turned off so as not to interrupt the user who is taking a picture. When the user stops looking through the optical finder 104, the eye detector 47 detects this and the display of the image display 28 is turned on. In the above-described example, the image display 28 is turned off. However, if the image display 28 has a backlight, only the backlight can be turned off. Alternatively, the brightness of the backlight can be reduced.

When the operating unit 62 that functions as the shutter switch SW1 is operated, a photometry operation is started. Then, the result of the photometry operation is shown in the setting information display provided on the image display 28. At this time, the result of the photometry operation is also shown on the finder display 54 disposed in the optical finder 104. When the photometry operation is not performed, the finder display 54 is turned off.

Figure 4:
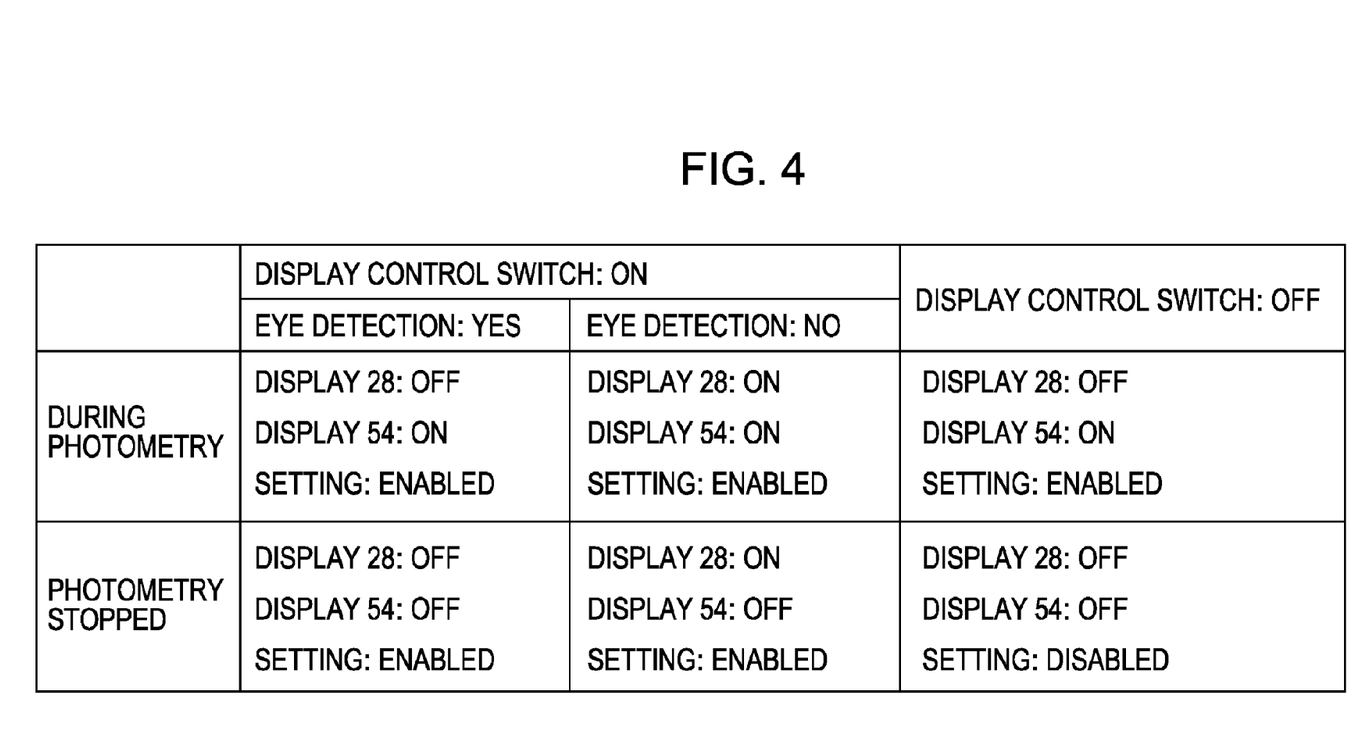
FIG. 4 is a table illustrating display states of the image display and the finder display and an enabled/disabled state of a setting operation.

FIG. 4 is a table showing the states of the display control switch 68, the eye detector 47, and the photometry operation, the display states of the image display 28 and the finder display 54, and the enabled/disabled states of various setting operations for setting the shutter speed, the aperture value, the exposure correction value, etc.

If the operating unit 70 is operated so as to change the shutter speed, the aperture value, or the exposure correction value, the operation is disabled only when the image display 28 is turned off by the display control switch 68.

Figure 5:
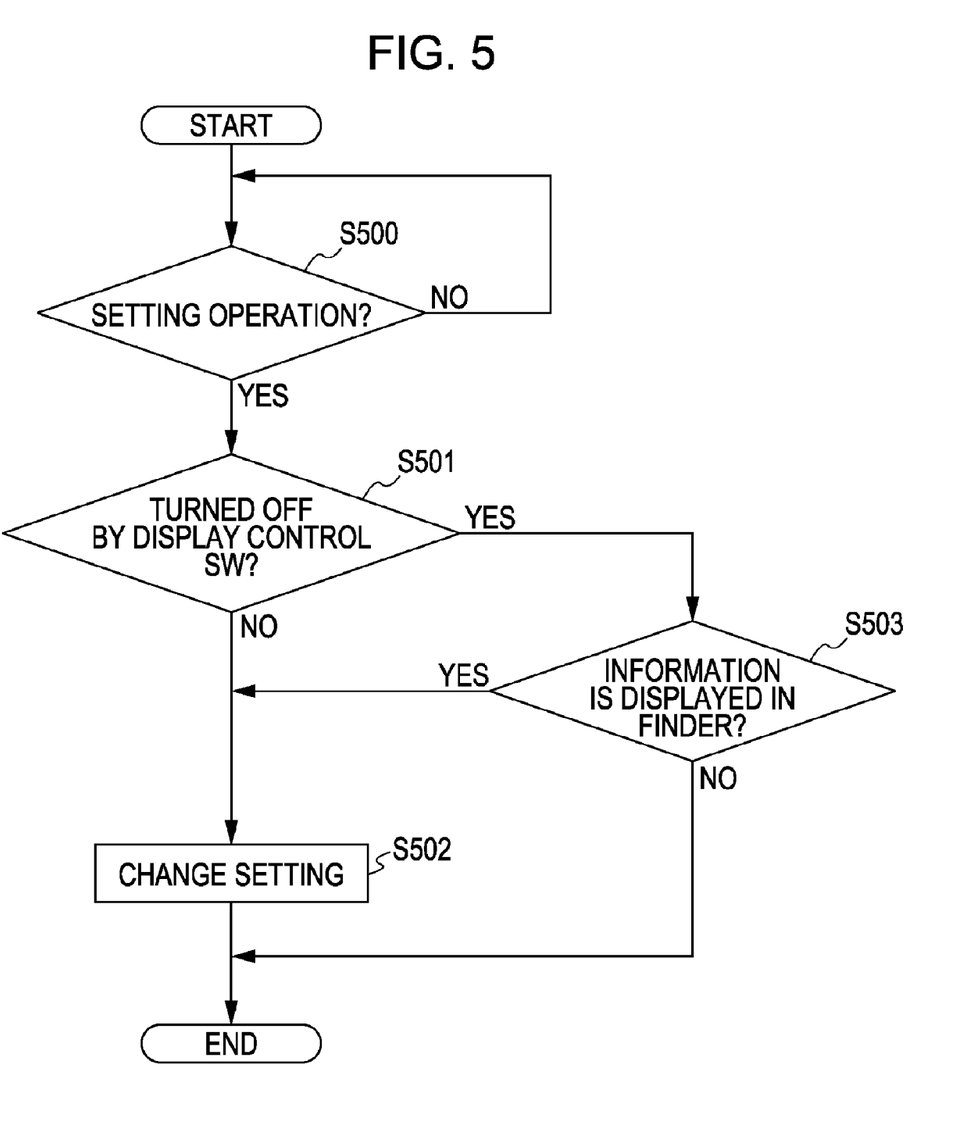
FIG. 5 is a flowchart for a set-value changing operation.

A flowchart of such a process is shown in FIG. 5. Referring to FIG. 5, when a setting process is received in Step S500, the process proceeds to Step S501, where it is determined whether or not the image display 28 is turned off by the display control switch 68. If it is determined that the image display 28 is not turned off by the display control switch 68 in Step S501, the process proceeds to Step S502 and the set value is changed.

If it is determined that the image display 28 is turned off by the display control switch 68 in Step S501, the process proceeds to Step S503, where it is determined whether or not the finder display 54 is turned on. If it is determined that the finder display 54 is turned on in Step S503, the process proceeds to Step S502, where the set value is changed. If it is determined that the finder display 54 is not turned on in Step S503, the set value is not changed.

Figure 6:
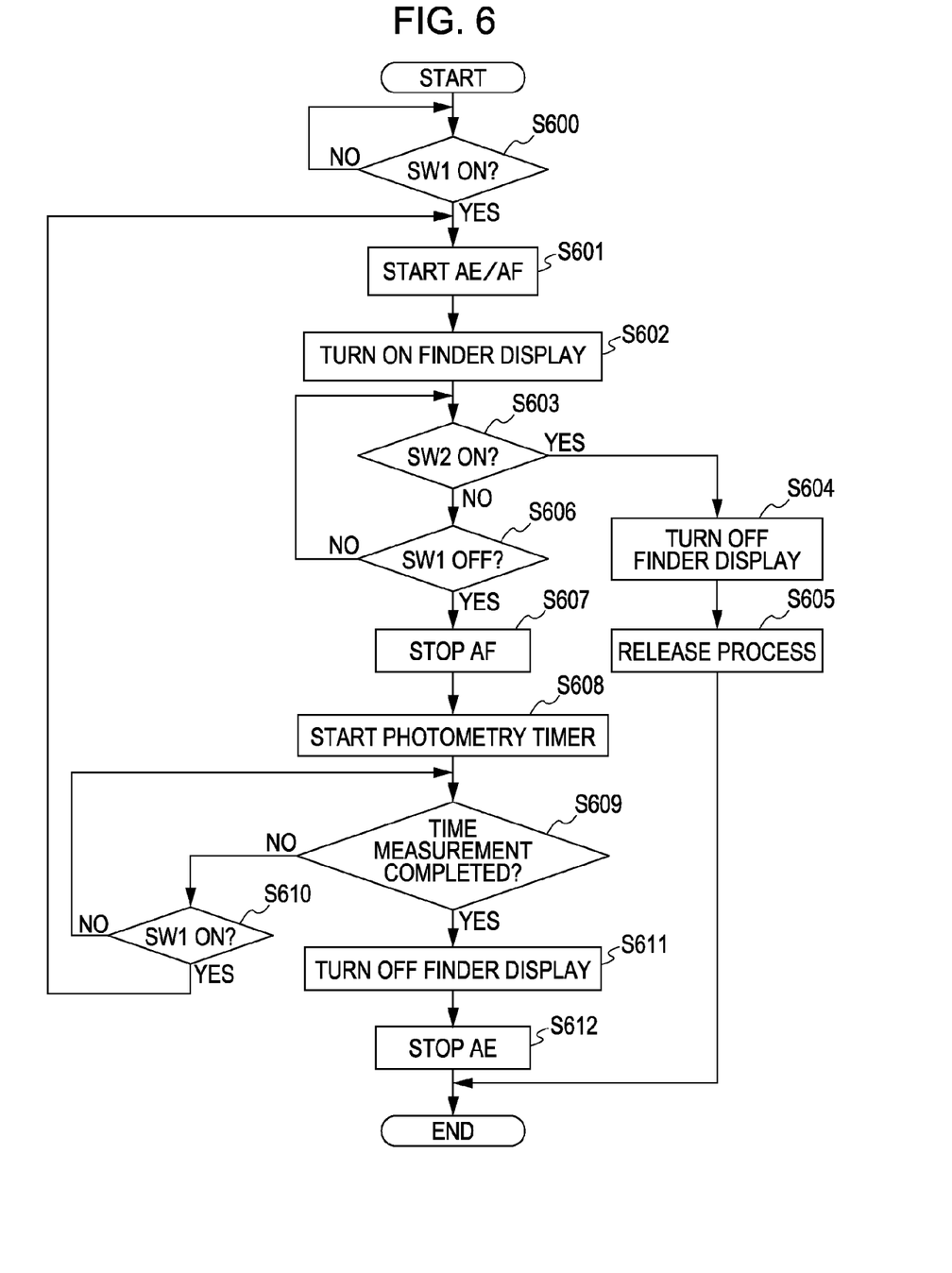
FIG. 6 is a flowchart for a process for displaying information on the finder display.

FIG. 6 is a flowchart of a process for controlling the display shown on the finder display 54. When an operation of the operating unit 62 that functions as the shutter switch SW1 is detected in Step S600, the process proceeds to Step S601.

In Step S601, the photometry operation and the ranging operation are started. In Step S602, the finder display 54 is turned on to show the display during the photometry operation. Then, the process proceeds to Step S603. When an operation of the shutter switch SW2 is detected in Step S603, the process proceeds to Step S604, where the finder display 54 is turned off. Then, the process proceeds to Step S605, where a release process is performed.

If the operation of the shutter switch SW2 is not detected in Step S603, the process proceeds to Step S606, where it is determined whether or not the shutter switch SW1 is turned off. If it is determined that the shutter switch SW1 is turned off in Step S606, the ranging operation is stopped in Step S607. Then, the process proceeds to Step S608, where measurement of a photometry timer is started.

If it is determined that the shutter switch SW1 is not turned off in Step S606, the process returns to Step S603. After the measurement of the photometry timer is started in Step S608, Steps S609 and S610 are repeated until it is determined that the measurement of the photometry timer is completed in Step S609 or until it is determined that the shutter switch SW1 is turned on again in Step S610.

If it is determined that the measurement of the photometry timer is completed in Step S609, the process proceeds to Step S611, where the finder display 54 is turned off. Then, the photometry operation is terminated in Step S612. Then, when the shutter switch SW1 is turned on again in Step S610, the process returns to Step S601.

Accordingly, the setting information and the photometry information are displayed on the finder display 54 during the photometry operation, and the finder display 54 is turned off when the photometry operation is not performed.

Due to the above-described procedure, a set-value changing operation intended by the user is accepted while a set-value changing operation that is assumed to be unintentional is rejected. Accordingly, mistaken operation can be prevented.

In the present embodiment, the setting information display is turned off when the display control switch is operated or when it is detected that the user is looking through the optical finder. However, conditions under which the display is turned off are not particularly limited. Even when the display is turned on, if the setting information display is not shown, the problems of the known structure cannot be solved. Therefore, whether or not the setting information display is shown can be checked instead of whether the display itself is turned on or off.

The number of conditions under which the setting information display is turned off is not limited to two, and the setting information display can also be turned off in response to any plural number of conditions. In such a case, the acceptance/rejection of the set-value changing operation can be determined on the basis of the combination of the conditions. In addition, the set values that can be changed by the set-value changing operation are not limited to the shutter speed, the aperture value, and the exposure correction value.

In the camera according to the present embodiment, the liquid crystal display for displaying the photographing information, such as various set values, and the image data is turned off not only when the operating unit is operated but also when the camera decides to turn off the liquid crystal display from the situation. When the liquid crystal display is turned off in response to the operation of the operating unit, the operation of changing the setting, such as the photographing conditions, is disabled. Accordingly, the set values are prevented from being changed in response to an unintentional operation by the user. When the liquid crystal display provided on the back side of the camera is turned off in response to the result of eye detection, the set-value changing operation for changing the shutter speed, the aperture value, the exposure correction value, etc., is continuously enabled. However, when the liquid crystal display is turned off in response to the operation of the operating unit for turning off the liquid crystal display, the set-value changing operation for changing the shutter speed, the aperture value, the exposure correction value, etc., is disabled. Accordingly, the set-value changing operation intended by the user is accepted, while a set-value changing operation that is assumed to be unintentional is rejected. As a result, mistaken operation can be prevented.

In the case in which the eye detector 47 is not functioning, the set-value changing operation can be enabled only when the information display is shown in the finder display 54 irrespective of the state of the image display 28.

Second Exemplary Embodiment

A single-lens reflex digital camera according to a second embodiment of the present invention will be described below. The overall structure according to the second embodiment is similar to that shown in FIG. 1, and explanations thereof are thus omitted.

Figure 7:
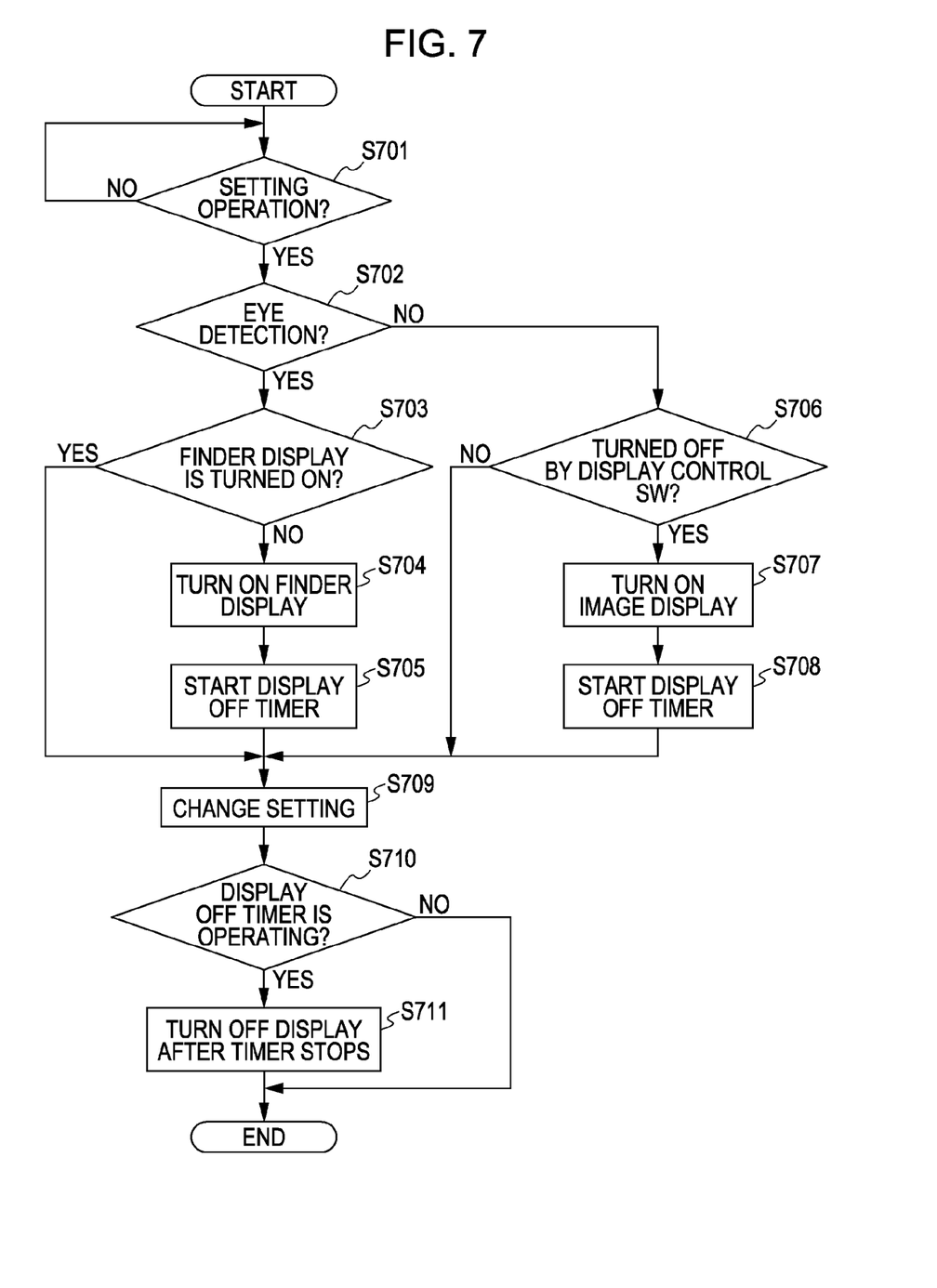
FIG. 7 is a flowchart for a display operation performed when the set-value changing operation is performed.

FIG. 7 is a flowchart of a process executed when a set-value changing operation is performed while the image display 28 is turned off.

When an operation for changing the shutter speed, the aperture value, or the exposure correction value is performed by the operating unit 70 in Step S701, the process proceeds to Step S702, where an eye detection result is checked. When it is determined that the user is looking through the finder in Step S702, the process proceeds to Step S703, where it is determined whether or not the display state of the finder display 54 is checked.

If it is determined that the finder display 54 is already turned on in Step S703, the process proceeds to Step S709. If the finder display 54 is turned off, the process proceeds to Step S704, where the finder display 54 is turned on and preparation for displaying the set-value changed by the set-value changing operation is performed.

Then, the process proceeds to Step S705, where a display off timer is started. If it is determined that the user is not looking through the finder in Step S702, the process proceeds to Step S706, where it is determined whether or not the image display 28 is turned off by the display control switch 68. If it is determined that the image display 28 is turned off by the display control switch 68, the process proceeds to Step S707, where the image display 28 is turned on and preparation for displaying the set-value changed by the set-value changing operation is performed.

Then, the process proceeds to Step S708, where the display off timer is started. If it is determined that the image display 28 is already turned on in Step S706, the process proceeds to Step S709. In Step S709, the set-value changing operation detected in Step S701 is enabled and the set value is changed.

If the display off timer is started in Step S710, the process proceeds to Step S711, where the process waits for the timer to stop. Then, the display turned on in Step S704 or Step S707 is turned off.

As described above, the user can turn off the display of the image display on the back side of the image processing apparatus or the backlight for reducing the power consumption. In addition, when the user is looking through the optical finder, the display of the image display or the backlight can be automatically turned off so as not to interrupt the user. In such cases, due to the above-described operation, a setting operation can be readily performed without cancelling the power-saving setting or interrupting the user by suddenly turning on the display of the image display on the back side. In addition, if a setting is made by mistake in response to an unintentional operation by the user, the user recognizes the mistake.

According to the present embodiment, the image display is turned off in response to the result of eye detection or the operation of the display control switch. However, conditions under which the image display is turned off or the number of conditions are not particularly limited. For example, third and fourth conditions can also be provided. In such a case, when a setting operation is performed, whether or not to turn on the image display can be determined on the basis of the conditions.

In the camera according to the present embodiment, when an operation for setting the shutter speed, the aperture value, the exposure correction value, etc., is performed, it is determined whether or not the user is looking through the finder. When the user is looking through the finder, the finder display 54 is turned on for a predetermined time period. If the user is not looking through the display, the image display 28 is turned on for a predetermined time period. Accordingly, if the operation is performed by mistake, the user can recognize the mistake.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-219847 filed Aug. 11, 2006, which is hereby incorporated by reference herein in its entirety.

What is claimed is:

1. An image pickup apparatus, comprising:
   a photographing-condition setting unit configured to set a photographing condition in response to an operation of a first operation member;
   a display configured to display the photographing condition set by the photographing-condition setting unit;
   a first display controller configured to control whether to display the photographing condition on the display in accordance with an operation of a second operation member;
   an eye detector configured to detect whether a user is looking through a finder;
   a second display controller configured to control whether to display the photographing condition on the display in accordance with an output from the eye detector; and
   a control unit configured to control the photographing-condition setting unit such that, while the first display controller controls the display to not display the photographing condition, the photographing condition setting unit does not set the photographing condition in response to the operation of the first operation member, and while the second display controller controls the display to not display the photographing condition, the photographing condition setting unit sets the photographing condition in response to the operation of the first operation member without the display displaying the photographing condition.

2. An image pickup apparatus as claimed in claim 1,
wherein, if the eye detector detects that a user is looking through the finder, then the second display controller controls the display to not display the photographing condition in response to the eye detector detecting that a user is looking through the finder and the photographing-condition setting unit sets the photographing condition in response to the operation of a first operation member.

3. An image pickup apparatus as claimed in claim 1, wherein the photographing condition is configured to be conveyed through at least one of a value, text, and an icon.

4. An image pickup apparatus as claimed in claim 3, wherein the photographing condition is conveyed through at least one of shutter speed, aperture value, and an in-focus value.

5. An image pickup apparatus, comprising:
a photographing-condition setting unit configured to set a photographing condition in response to an operation of a first operation member;
a display configured to display the photographing condition set by the photographing-condition setting unit;
a first display controller configured to control an on/off state of the display in accordance with an operation of a second operation member;
an eye detector configured to detect whether a user is looking through a finder;
a second display controller configured to control the on/off state of the display in accordance with an output from the eye detector; and
a control unit configured to control the photographing-condition setting unit such that,
while the first display controller controls the display to be turned off, the photographing condition setting unit does not set the photographing condition in response to the operation of a first operation member, and
while the second display controller controls the display to be turned off, the photographing condition setting unit sets the photographing condition in response to the operation of the first operation member without the display being turned on.

6. The image pickup apparatus as claimed in claim 5,
wherein, if the eye detector detects that a user is looking through the finder, then the second display controller turns off the display in response to the eye detector detecting that a user is looking through the finder and the photographing-condition setting unit sets the photographing condition in response to the operation of a first operation member.

7. The image pickup apparatus as claimed in claim 5,
wherein the display is a display device having a backlight, and the first display controller is configured to control an on/off state of the backlight.

8. An image pickup apparatus, comprising:
an eye detector configured to detect whether a user is looking through a finder;
a photographing-condition setting unit configured to set a photographing condition in response to an operation of an operation member;
a main display configured to display the photographing condition set by the photographing-condition setting unit;
a first display controller configured to control whether to display the photographing condition on the main display;
a finder display that displays configured to display the photographing condition set by the photographing-condition setting unit, wherein the finder display is disposed in the finder; and
a second display controller configured to control whether to display the photographing condition on the finder display,
wherein the first display controller and the second display controller operate such that in case when the first display controller controls the main display to not display the photographing condition on the main display and the second display controller controls the finder display to not display the photographing condition on the finder display,
the finder display displays the photographing condition if the operation member is operated and the eye detector detects that a user is looking through the finder, and
the main display displays the photographing condition if the operation member is operated and the eye detector detects that a user is not looking through the finder.

9. An image pickup apparatus, comprising:
an eye detector configured to detect whether a user is looking through a finder;
a photographing-condition setting unit configured to set a photographing condition in response to an operation of an operation member;
a main display configured to display the photographing condition set by the photographing-condition setting unit;
a first display controller configured to control an on/off state of the main display;
a finder display configured to display the photographing condition set by the photographing-condition setting unit, wherein the finder display is disposed in the finder; and
a second display controller configured to control an on/off state of the finder display,
wherein the first display controller and the second display controller operate such that in case when the main display is turned off by the first display controller and the finder display is turned off by the second display controller,
the finder display is turned on if the operation member is operated and the eye detector detects that a user is looking through the finder, and
the main display is turned on if the operation member is operated and the eye detector detects that a user is not looking through the finder.

* * * * *